(12) United States Patent
Fontaine

(10) Patent No.: US 7,571,151 B1
(45) Date of Patent: Aug. 4, 2009

(54) DATA ANALYSIS TOOL FOR ANALYZING DATA STORED IN MULTIPLE TEXT FILES

(75) Inventor: Norman Fontaine, Painted Post, NY (US)

(73) Assignee: Gneiss Software, Inc., Painted Post, NY (US)

( * ) Notice: Subject to any disclaimer, the term of this patent is extended or adjusted under 35 U.S.C. 154(b) by 165 days.

(21) Appl. No.: 11/303,621

(22) Filed: Dec. 15, 2005

(51) Int. Cl.
*G06F 7/00* (2006.01)
*G06F 17/30* (2006.01)

(52) U.S. Cl. ......................................... 707/1; 707/101
(58) Field of Classification Search ........................ 707/1
See application file for complete search history.

(56) References Cited

U.S. PATENT DOCUMENTS

| | | | |
|---|---|---|---|
| 5,189,633 A | 2/1993 | Bonadio | |
| 5,832,496 A * | 11/1998 | Anand et al. | 707/102 |
| 5,870,746 A * | 2/1999 | Knutson et al. | 707/101 |
| 6,175,832 B1 * | 1/2001 | Luzzi et al. | 707/10 |
| 6,243,713 B1 * | 6/2001 | Nelson et al. | 707/104.1 |
| 6,519,571 B1 * | 2/2003 | Guheen et al. | 705/14 |
| 6,629,081 B1 * | 9/2003 | Cornelius et al. | 705/30 |
| 6,731,625 B1 * | 5/2004 | Eastep et al. | 370/352 |
| 6,750,864 B1 * | 6/2004 | Anwar | 345/440 |
| 6,917,972 B1 | 7/2005 | Basko et al. | |
| 6,990,238 B1 * | 1/2006 | Saffer et al. | 382/224 |
| 7,165,041 B1 * | 1/2007 | Guheen et al. | 705/26 |
| 7,275,235 B2 * | 9/2007 | Molinari et al. | 717/100 |
| 2003/0061212 A1 * | 3/2003 | Smith et al. | 707/6 |
| 2003/0144868 A1 * | 7/2003 | MacIntyre et al. | 705/1 |
| 2003/0177025 A1 * | 9/2003 | Curkendall et al. | 705/1 |
| 2004/0010515 A1 * | 1/2004 | Sawafta | 707/104.1 |
| 2004/0024720 A1 * | 2/2004 | Fairweather | 706/46 |
| 2004/0117358 A1 * | 6/2004 | von Kaenel et al. | 707/3 |
| 2004/0254957 A1 * | 12/2004 | Hyotyniemi et al. | 707/104.1 |
| 2005/0021496 A1 * | 1/2005 | Burke | 707/1 |
| 2005/0086239 A1 * | 4/2005 | Swann et al. | 707/100 |
| 2005/0086256 A1 * | 4/2005 | Owens et al. | 707/103 R |
| 2005/0165731 A1 * | 7/2005 | Funk | 707/1 |
| 2006/0117303 A1 * | 6/2006 | Gizinski | 717/136 |
| 2007/0053513 A1 * | 3/2007 | Hoffberg | 380/201 |
| 2007/0112714 A1 * | 5/2007 | Fairweather | 706/46 |
| 2007/0168154 A1 * | 7/2007 | Ericson | 702/179 |
| 2007/0198653 A1 * | 8/2007 | Jarnagin et al. | 709/217 |

* cited by examiner

*Primary Examiner*—John R. Cottingham
*Assistant Examiner*—Mohammed R Uddin
(74) *Attorney, Agent, or Firm*—Mark Levy; Hinman, Howard & Kattell, LLP

(57) ABSTRACT

A system for organizing data in multiple text data files and for automatically parsing data directly into named variables within a single, user-configurable graphical user interface (GUI) or workspace. Results organization, analysis algorithms, and file viewing all take place from within the workspace. No apriori knowledge of the dimensionality or length of data is required. Results may readily be placed into reports. Multiple data files may be processed using batch commands. Metafile capability is provided wherein data within a first level file may be the name of another data file allowing cascaded processing of data files. This unification of a user-configurable workspace, an integrated file viewing method and a parsing method minimizes distraction to a researcher allowing him or her to focus on analysis of experimental data rather than on the mechanics of data processing. The system of methods interacts with third party data analysis application software packages.

1 Claim, 10 Drawing Sheets

— 130

HEADER INFORMATION

Sample ID,145670-234r
Bench Type and Number,TestBed 2
Run Duration, 3300 sec
Measurement Type,Special
Recipe, Just run it!
EmployeeID, #12345678
Spot Size,40
Laser Full Width,3
Date Time Created,10-May-2004 9:23:32 PM
Reference File, Reference11.dat
Raw Data Saved, True
Raw Data Version, 4

} 132

HARDWARE INFORMATION

Oscilloscope
Time Range, 10 ns
Calibrated Time Range, 9.97E-09
Mode, Operate
Attenuation, x10
Trig. Mode, Cont
Trigger Status, Unknown
Trigger Slope, Rising SPECTROGRAPH
Wavelength, 633.2
Grating, 600 g/mm
Slit Width, 50
Blaze, 1200
Ruling, 1200

DELAY Generator
Trig. Mode, Ext.
Repetition Rate, 10000
Setting, M1
Delay A, 0.00002055679
Delay B, 0
Delay C, 0
Delay D, 0

} 134

String Matrix, This, is, the First, Row
String Matrix, This, is, the Second, Row   } 136

A StringRow, These, Can Be, Headers, For Your Columns } 138

Figure 2a

A StringColumn, These
A StringColumn, Can Be
A StringColumn, Headers
A StringColumn, For Your Rows
} 140

A LineDat, 34, 99.456, 23.4534, 234.2342, 2452, 234.234, 55690 } 142

A ColumnDat, 4
A ColumnDat, 5
A ColumnDat, 6
A ColumnDat, 54.3
} 143

Embedded numbers 92 and 105 text 43.233 } 144

MISC INFORMATION
No of Averages, 100
Attenuation, 20.21 db
Pixel Bin, 94
Wavelengthspan, 25.8823
Ref Wavelength, 633.2
} 146

SCAN INFORMATION
Y Axis XLocation, 0
Z Axis XLocation, 0
Scan Axis, X
} 148

Position,105,107,109,111,113,115,114,116,119,120,120,120,120,
121,119,119,120,121,123,125,126,127,130,129,128,129,132,
135,137,138,141,144,148,151,151,150,149,148,147,150,151,149,
145,142,142,143,141,137,133,136,144,154,...
Position,103,106,108,110,113,115,115,117,120,122,123,123,123,
123,123,123,123,124,125,126,127,128,130,130,130,133,135,
137,137,137,139,142,146,148,149,149,148,148,148,
149,150,150,149,147,146,146,145,142,140,139,142,148,...
Position,100,103,105,108,111,113,116,118,122,124,124,124,
125,125,127,126,126,126,127,128,129,129,130,131,132,135,138,138,
137,136,137,140,144,147,148,149,149,149,149,148,148,150,
152,152,149,146,147,146,144,141,141,145,...
} 150

Figure 2b

DATA ANALYSIS TOOL FOR ANALYZING DATA STORED IN MULTIPLE TEXT FILES

FIELD OF THE INVENTION

The invention pertains to data extraction and analysis and, more particularly, to a method for automatically extracting data from diverse sources and identifying relationships therein.

BACKGROUND OF THE INVENTION

The human brain discovers new information and relationships by sorting through vast quantities of information, discarding information that is of no interest and then analyzing and organizing the remaining important information into new constructs. This requires the use of short-term memory that allows a person to focus narrowly on the newly organized information and newly created constructs. Long-term memory allows a human being to recall information that was organized previously and enables comparison of the recalled information to new information. These long-term and short-term memory operations allow human beings to discover and report new relationships among recalled and new information.

Three actions are assumed critical to the processes of discovering and reporting new information: 1) collating and processing important information while discarding unimportant information, 2) rapidly reviewing and comparing large quantities of new and old information, and 3) organizing new insights into new information constructs.

A recent article in Discover magazine states, "The human brain has evolved different modes for concentrating on a single thing versus jumping from one thing to another .... And the cost is that it takes several minutes to shift back ... that's the way we're wired." (Does e-mail make you dumber?, Anne Casselman, Discover, August 2005, p. 8) While this article discusses the effect of the loss of focus in the context of approaching tigers, phone calls and new e-mails, the same basic considerations apply to data analysis and scientific discovery. Operations that require a researcher to change his or her focus from analysis and report writing to the mechanics of loading, locating, processing, changing views and transferring information from raw data to finished reports can be at least slightly detrimental and possibly severely debilitating to the discovery and reporting processes.

Consequently, a combination of automated or semi-automated data processing, configurable result viewers and result transfer functionalities may be advantageous to the researcher. Such tools may allow the researcher to maintain focus when dealing with large amounts of data having many diverse forms and originating from many different source files. By using such tools a researcher's brain is allowed to maintain a sharp focus on the selected items of interest. One technology that exemplifies a system that addresses precisely this need for the maintenance of focus and processed data organization is the heads-up display.

In the realm of scientific research and sample measurements, scientists and engineers must develop protocols for storing raw data and then later retrieving that raw data. They typically must develop analysis tools to process the stored data. Analysis of the stored data, including organizing measured results, enables scientific discovery. Scientists and engineers must also develop protocols for transferring the results of the analyses into reports for documentation and dissemination.

Often, the data of interest that must be processed and analyzed is unique to a particular measurement system, hardware configuration, and measurement sample. While not all of the raw data may be necessary in later analyses, often the researcher is not certain which data will be important for future post-measurement analysis. As a consequence, it is the safest practice to save all information about each measurement in a single data file and later extract only data entries of interest for each analysis. This, however, is rarely done as it is far easier to save only the simplest data that is of the most interest at the time. This practice is followed because it is often too difficult to extract the information of interest using standard packages when the data is buried in data files with data of mixed types.

The full set of data may be quite complex, for example, including some or all of the following: the date and time of the measurement, an identification code of the sample under test, a system operator identification code, comments on the conditions of the experiment, measurement protocols such as data sampling parameters, identification of multiple and varied hardware components within the system, the settings of multiple and varied hardware components within the system, the actual measurement data itself, the filenames of other files that contain relevant reference, calibration, or experimental data, and the reference, calibration or experimental data contained in those other files. Each of the aforementioned measurement and hardware data items may be text or numeric. In addition, data in each entry field may be of various dimensions, including: scalar (e.g., single entry), vector (e.g., one-dimensional [1-D] row-wise or column-wise array of elements), or matrix (e.g., a two-dimensional [2-D] row and column-wise array of elements).

Adding to this complexity is the fact that the form of the data file structures may vary considerably. For example, each dimension in a vector or matrix entry may be of arbitrary length, the order and layout of the different sections of data in multiple files may vary, and new types of hardware may be introduced into the system during the development process, requiring the ability to add or modify the data layout in subsequent data files. Furthermore, a scientist may want to process data from many (perhaps hundreds) of diverse data files, one file at a time.

A scientist may also want to collate, process, view and compare data and results from various fields across a set of many data files which may also number in the hundreds. These data files may be contained in single or multiple folders or directories (i.e., locations). These folders may also contain other types of data files as well as non-data files. The data may need to be analyzed multiple times over the course of days, weeks, months or years using new analysis protocols that are under development.

Consequently, it is highly desirable to be able to open any of the raw data files and inspect the contents using, for example, a simple text editor during both the development of the measurement systems and when processing the data. The inspection process is simplified when the data in the files are stored in an organized and commented text file format with a mixture of identifying text and data that is laid out in an aesthetically pleasing, easy-to-read format.

Another issue important to a researcher is that, during the initial phase of the R&D process, most aspects of the measurement systems and the data are evolving. Hardware systems that are easily and flexibly modified allow the rapid integration of new hardware and/or the creation of new experimental variations for the purposes of discovery. These modifications translate directly to the data files in that each data file set may need to contain varying output data structures, lengths, and layouts. Because a state of flux typically exists in an experimental environment, it is important that a researcher have the ability to rapidly develop creative and new experiments, to generate new data types, and to develop and modify data analysis algorithms on-the-fly. In addition, the development of new analysis algorithms and searching for new data relationships may necessitate re-processing of recently acquired and old data files using such evolving analysis algorithms.

Once an analysis software package has been chosen, a user must adapt his or her way of saving data, processing data, developing algorithms, and reporting results using the tools and protocols supplied by that chosen analysis software package. Many of the currently available data analysis packages provide advanced computational functions that address scientific analysis needs. However, none of the currently available packages provides an integrated set of tools that enables a researcher to rapidly develop a flexibly configured results region and then automatically or semi-automatically import and analyze multiple complex text data files while monitoring a results focus region.

Currently, state-of-the-art data analysis software includes of a number of well-developed packages such as Microsoft Excel®, Mathematica®, MatLab®, and Mathcad®. All of these software packages provide excellent sets of computational functions that enable development of complex and multi-step data analysis algorithms. Such packages typically also provide graphical templates that users may insert into the analysis programming environment. Users may then enter their specific data or analysis results into graphs by pasting, using wizards, or using programming-style commands.

The aforementioned data analysis packages provide simple fixed field and fixed format text data file importation functions. Fixed field means that all entries (fields) in the file must have the same column width. Fixed format requires that all data entries must have the same delimiter separating each field (e.g., comma separated variable or csv files) in the data file. During the importation of data from the files, the currently available fixed importation commands allow the start and ending rows of data in the file to be specified.

The analysis of data files using such rigid importation methods may be problematic when processing more than one data file. This is because such fixed methods will load multiple data fields from each data file into formulas in the analysis program based only upon their precise locations in the data file. When using fixed format importation, the data in multiple text files must have precisely the same location in every file and the entries must be of a predetermined number and dimensionality. Such fixed format data importation methods lead to an indirect association of the data with the variables and/or computational functions. This approach often gives rise to computational errors when multiple, complex data files having different layouts are processed. Computational errors may occur when a data field exists in one file but not in the other, when the order of the data fields changes, the number of entries in a data field changes, or the dimensionality of a data field changes between files.

If the data file layout varies between files, as is frequently the case in R&D environments, the only known solution to the problem has heretofore been to manually alter each and every one of the affected data processing algorithms within the analysis program to accommodate the specific layout of each data file. This approach requires that each data analysis program must be stored and used only with a particular associated set of data files, which greatly increases the complexity of analyzing and processing multiple data files from evolving measurements and measurement systems. The actions that must be taken by the user to monitor and compensate for indirect association errors and to maintain numerous analysis programs may cause a severe loss of focus on the part of the researcher when analyzing multiple files.

Considerable effort has recently been expended to developing platform integration whereby software packages may pass data between application interfaces and may call one another's routines for computation. Recently, efforts have also been directed toward enabling integration of the analysis software directly into user configurable report templates. The integration of analysis software with the reporting document and the use of report templates is a great aid in the semi-automatic generation of reports. Such an approach enables consistency of reporting style, useful particularly from a quality control perspective. In addition, the integration of analysis programs and documents enables the generation of interactive educational tools. However, during the R&D phase, it makes little sense to spend time developing these interfaces or methods because the results of interest, the organization of those results, and the display of those results are in a continual state of flux. In other words, interfaces developed today may be of no use tomorrow and data exchange protocols between software packages may have to be continually re-programmed.

Because of the constantly changing environment of the initial R&D phase, a less structured reporting format is often acceptable during reporting, it generally being understood that the presenter has not "fully polished" the analysis methods and/or the results in his or her reports. Because this practice is widely accepted in the R&D community, the development of inter-package data analysis algorithms and sophisticated user interfaces is viewed as more of a distraction than an aid during the initial R&D phase. Therefore, most of the recent efforts by software companies to provide inter-operability of analysis packages and fixed format styles of report generation are of little use and little interest to scientists and engineers involved in the first stages of R&D or exploratory data analysis.

An additional problem with developing protocols that transfer data between packages is the loss of focus that may occur when changing display windows. Loss of focus may also occur when the person who is developing the data analysis routines must switch between the use of completely different languages and algorithm development interfaces.

Another problem with data exchange between various software packages is that it typically requires the purchase of multiple software packages for installation on each computer where the software is used. Data analysis software packages are frequently quite expensive.

Other efforts have been directed toward collating data from networked computer environments, where there is a need to gather information from many computers and to collate that data for later or dynamic processing. Software and systems that meet these needs include many web-based applications and data collating search engines. Such an approach is described in U.S. Pat. No. 6,917,972 for PARSING NAVIGATION INFORMATION TO IDENTIFY OCCURRENCES CORRESPONDING TO DEFINED CATEGORIES, issued Jul. 12, 2005 to Basko et al. Such approaches, however, do not typically address the unique needs of scientists and engineers who are developing measurement systems in an exploratory research mode.

In addition to the aforementioned deficiencies in data importation, deficiencies exist in data analysis packages of the prior art. For example, spreadsheet programs, such as Excel, have a number of additional shortcomings with regard to data processing and analysis of single and multiple files.

These additional shortcomings include the fact that the most prominent items in the viewing space are the data in individual data cells. In general, a research scientist, engineer, or other such user does not care to view a specific value in a specific cell, but is more interested in the relationships and computations between vectors (columns or rows) or matrices of data. Also, the computational formula for a group of data is contained in a small bar, typically hidden until the user manually selects the cells that receive the results of the computation. Computations proceed by indirectly referencing data by cell addresses and not by directly associating the data with easily identifiable variable names. Computational flow is completely unstructured in that computations may be made on indirect references to data variables whose cell locations can lie anywhere in one or more spreadsheets.

The locations of those specific cells within the workspace are typically not obvious or not easily determined. Graphs must be placed on separate windows or on top of the work sheet cells. This then requires the user to switch his or her focus between the graphical display window, the computational formulas and the data areas. This frequent shifting of focus may interrupt the user's train of thought. Changes to items in the graph must be performed by opening a wizard which allows the manual selection of a group of cells for plotting on each axis. In addition, common spreadsheet programs do not provide a native data file importation mechanism that can be activated by a simple index change or key press. Finally, there is no native ability to easily batch file process or organize imported data from multiple data files.

Consequently, spreadsheet programs require many detailed manual operations to load data files and to make changes to the data processing algorithms as well as to display results from multiple files. All such manual operations required for processing single and multiple data files may also cause a loss of focus for the user. As a result, spreadsheet programs are not typically appropriate for analyses containing many computation steps or the importation of complex data from sets of multiple data files.

Programming-style data analysis packages such as Matlab or Mathematica provide a higher level of data analysis sophistication than do spreadsheets. Such programs provide the ability to directly associate variable names with the various data types for use in later computations. However, the data importation facilities typically provided by these analysis packages are still problematic. Data is usually read from fixed format files and the association is made by the data's location in the file. Consequently, the problems caused by data importation methods that use indirect association described for spreadsheet programs are still present with these analysis packages.

Moreover, some programming-style languages, such as Matlab, do not use standard mathematical symbols for computations. This is a detriment to engineers and scientists who are skilled in efficient mathematical language. In Matlab, numerous windows are used to contain information on disparate items. One window is needed for interactive program statements. This window is not static; it scrolls as each new command is entered and the output is displayed. Other windows are needed for programmatic data analysis algorithms, data variables, filename directories and graphical data.

In addition, the windows must be resized, opened, closed or stacked to change or enlarge views. The need for manual window re-sizing and the inflexible methods of computation and result organization hinder a user's important ability to rapidly and easily organize new and arbitrary information into computational and visual constructs. Human beings think and develop analyses in an ordered and sequential computational format that proceeds from the top down and from left to right or right to left, in some languages. Neither spreadsheets nor the multi-windowed Matlab interface provide this capability and, consequently, both may lead to confusion and loss of focus during their use.

Mathematica does allow imbedding graphs within a single workspace and sequential display of analysis algorithms. However, the programming style user interface may seem cryptic in that extremely complicated and non-intuitive programming statements are required to perform data analysis, graphing, and organizing single or multiple graphs. These complicated analysis statements and non-intuitive graphing methods still require a considerable amount of focus to develop and review. Mathematica does provide functions that allow the user to develop very general text file parsing capabilities. However, Mathematica does not provide guidelines for formatting and then importing complex data files; the user must develop his own text parsing formats and routines. Without guidelines, the data files are often organized by the researcher to appear more like spreadsheet formats, which becomes problematic when attempting to extract information in an automated fashion. Even with Mathematica's ability to parse text data files, it is not intuitively obvious to a user how to structure data files and then present commands that can import data from multiple and complex data files with varying layouts in the data entries.

It is also non-obvious how data from the same field in multiple files may be collated and processed in Mathematica. Mathematica does not solve all of the problems regarding complex data file handling, simple configuration of user interfaces and flexible results organization that are needed by the research scientist.

Another method that has been used to handle text data files involves importing data files into databases. Databases can provide an intermediate step for extracting and converting data types from text files, organizing that information across single and multiple data files and storing it for later retrieval in analysis software. However, using databases for organizing information introduces new problems to the researcher. The database requires additional steps as it must be programmed to load, collate and organize the data files. Thereafter, methods must be developed to retrieve that data from the database for loading into the data analysis software. This may be acceptable if the files always have the same layout. However, the method is typically unacceptable if the data files evolve during the development phase of an R&D project. If new fields of information are added to the text data files, then the databases must be re-programmed to handle that new data. In addition, databases require the database software to be installed or available on each computer where the data must be viewed and processed.

Databases do allow efficient storage of data as compared to text files, but this is generally of no importance to the user unless the data files or data sets are extremely large. As computer processing and storage capacity increases, the need for efficient data storage diminishes for most users.

The most intuitive program currently available for flexibility in computational algorithm development and maintenance of focus is embodied in a program called Mathcad. Mathcad provides a virtual "whiteboard" on a computer display, allowing the user to develop complex analyses in an intuitive manner that mimics how that person might perform computations at a whiteboard or chalkboard as described in U.S. Pat. No. 5,189,633 for APPARATUS AND METHOD FOR INTERACTIVELY MANIPULATING MATHEMATICAL EQUATIONS issued Feb. 23, 1993 to Allan R. Bonadio. Mathcad allows the user to enter computations in a structured, top-down, left-right sequential format in a static and editable display window. The user can place true mathematical notation and re-sizable graphs anywhere in the work area, which greatly aids in developing efficient computations and in developing and reviewing an analysis. Graphing is accomplished by pasting a graph into the document and then filling variable names into placeholders. This is similar to the manner in which a user might draw a graph on a whiteboard. Within Mathcad, the graphs may be re-sized and moved using simple mouse operations.

Unfortunately, Mathcad has major shortcomings when used as a scientific data file processing engine. First, Mathcad does not provide general text data file viewing or parsing capability for even a single, complex, text data file. The Mathcad file importation functions require a fixed format, which creates the same problems described hereinabove with regard to spreadsheets. Complex data files may be imported into matrices for further processing, however, in practice each measurement produces data of many different types (numeric and text; scalar, vector and matrix) which ideally are stored in a single complex data file, not just as a large matrix. Therefore, the file importation tools provided by Mathcad have the aforementioned deficiencies of complexity in use and indirect data association of the imported data with variable names in the workspace.

One mechanism for importing data files is to use file read/write components. However, using read/write components requires the user to change focus from an area of interest, move to the top of a worksheet area, manually select and load a single data file, and then return to the area of focus to view the updated results.

Another mechanism for data file importation in Mathcad is through its read functions. However, the Mathcad read functions do not parse the data files, but instead operate by use of a fixed format data importation method. The Data Analysis Extension pack provided by Mathsoft does provide commands that enable the importation of text data files into matrices, however, this does not allow direct parsing of the data files.

Neither the file read/write component nor the read functions can search out and load a selected data field from a file having an aesthetically pleasing mixture of text, data and white space. Because Mathcad cannot parse or a single, complex data file, it certainly cannot be used to process multiple text data files with a complex and varied mixture of data entries that may evolve over time. Because of these limitations, Mathcad by itself cannot be used to enable the automatic or semi-automatic parsing of single or multiple files or batch file parsing.

Some vendors offer data file parsing programs that may be used to convert raw text data files into new data file constructs for subsequent importation into data analysis packages. Other vendors offer data file parsing programs that provide commands that allow the user to develop programming statements that can be called to import data from files directly into named variables. Software Techniques, Inc., 773069 RR#2, Proton Station, Ontario, NOC 1L0 provides Parsing Tools and Guy Software, 1752 Duchess Avenue, West Vancouver, British Columbia V7V 1P9 provides ParseRat™. Parsing Tool provides a user the ability to import data from single or multiple files into named variables in a programming style analysis environment. Subsequently, the imported data may be analyzed using such packages such as MatLab, C, C++ or Visual Basic. While Parsing Tool is a useful tool, each data parsing and import operation requires writing specific "for-loops" and/or using parsing profiles that are written and stored in a database. As a result, the user must develop the sequence of programming statements that imports the data into each of the named variables; the user must maintain a database of parsing profiles. The user must also work in a multi-windowed, programming-centric environment where the region of focus for imported data, analysis algorithms and results cannot be easily or flexibly configured into a single workspace and a single focus region.

ParseRat does not provide the ability to integrate data imported from files directly into the analysis package. ParseRat is a tool for converting one file format into another and generating new files that may then be loaded into the analysis package using the protocols provided by that software analysis package. This additional step increases the complexity of data analysis and requires that at least two sets of files must be managed: the original file and the converted file that will be imported into the analysis package.

When processing large numbers of complex text data files, it is generally not sufficient to provide some aspects of automated data processing while ignoring other aspects. A computer program that does not use true mathematical notation or does not adhere to top-down analysis flow, but provides text file parsing and graphs alone will not provide the general purpose, convenient interface that is required for enabling a scientist or engineer to maintain optimal focus. Similarly, a computer program that provides mathematical notation, but which ignores the need for automated parsing and importing of text files will require that the user engage in numerous manual operations to import data from multiple files into the analysis package which may also cause a loss of focus. A program which does not allow automatic updating of computations in a static display, or scrolls the display of interactive commands in the viewing area, or forces the use of multiple windows for viewing different types of information, also creates an undesirable loss of focus to the user. Loss of focus also occurs if the user must develop and maintain protocols or programming statements that transfer data and results between formats and/or between different software packages.

What is needed is a single computer software system that provides a graphical user interface (GUI) that is integrated with a simple and fully automated data file parsing capability and a flexibly configured results region. Many scientists and engineers who must process multiple and complex data files will utilize such a tool. However, they will probably not switch to a software package that does not provide a complete multi-file processing solution or is cumbersome to program. Such a limitation would merely present a new set of deficiencies to the user. The ideal software package would, therefore, singularly handle data analysis of multiple files ranging from complex raw data through to the display of results using a single whiteboard-style interface and would allow a simple means for transferring those results into reports.

SUMMARY OF THE INVENTION

The system of the present invention has many advantages compared to any system of the prior art. Particularly, a user is freed from many cumbersome manual aspects of processing many complex data files. Using the methods of the invention, a user may flexibly organize numerous data results of interest that include many data types and data sources into a single viewing area. The single viewing area or whiteboard acts as configurable, virtual heads-up display of results. A method is provided for updating an index, thereby allowing semi-automated parsing and processing of individual text data files. This method enables the user to maintain a fixed focus on the result region while rapidly analyzing multiple data files.

A method is also provided for storing complex data in text data files such that the data is in an aesthetically pleasing and commented format when viewed in a text editor. A file parsing methodology and a small set of simple commands are provided that allow importing data from such complex text data files directly from those text data files into named variables. Text or numeric data may be imported into named variables and data may be in scalar, row-wise vector, column-wise vector, or matrix form. Also processed are generalized embedded numeric and text data forms. This same method is compatible with prior art methods in that files containing only numeric data can be imported from fixed format (e.g., comma, space, or tab delimited) data files indirectly into named variables using the same set of commands.

One important aspect of this invention is that the user need not have any a priori knowledge of the number of dimensions or length of each entry field. A second important aspect of the invention is that the number of dimensions or length of each entry field need not be the same across multiple data files. A third important aspect of the invention is that the individual data entry fields do not need to be located in a particular location or a particular order within each data file.

In addition, methods are provided that allow automated parsing and collating of data from the same data field within multiple data files into a single named vector variable by batchfile processing a group of files. The association of the data indexed within each returned vector variable directly corresponds to the name of the file from whence it originated within a vector of file names. Analyses may then be performed upon one or more of said named vector variables and the processed results then used for inter-file comparison of relationships amongst results. A method is also provided that allows cascading data file access of lower-level data files from the names that have been parsed from higher level text data files.

The analysis algorithms, the file viewing and parsing commands of the present invention, as well as the configurable focus (i.e., result) region are all contained within a single workspace. This approach greatly simplifies the interactive development of analysis algorithms and the use of those algorithms as a data analysis engine. Such simplification relieves a user from manual data importation and processing tasks so that he or she may focus on scientific discovery and the rapid generation of reports.

It is, therefore, an object of the invention to provide a system for semi-automatically analyzing experimental data.

It is another object of the invention to provide a system for semi-automatically analyzing data wherein the data is stored in text data files.

It is a further object of the invention to provide a system for semi-automatically analyzing data wherein the entries within the text data files are tokenized and directly parsed into named variables.

It is an additional object of the invention to provide a system for semi-automatically analyzing data wherein both single and multiple data files may be analyzed.

It is yet another object of the invention to provide a system for semi-automatically analyzing data that is compatible with third-party data analysis application software packages.

It is a still further object of the invention to provide a system for semi-automatically analyzing data wherein a user-configurable, whiteboard-like workspace or graphical user interface is provided.

It is another object of the invention to provide a system for semi-automatically analyzing data having a set of simple file parsing functions or commands callable from the workspace.

It is an additional object of the invention to provide a system for semi-automatically analyzing data wherein the user-configurable workspace includes a user-configurable results area.

It is a further object of the invention to provide a system for semi-automatically analyzing data wherein information appearing in the results section of the workspace may easily be transferred to a report using copy and paste techniques.

BRIEF DESCRIPTION OF THE DRAWINGS

A complete understanding of the present invention may be obtained by reference to the accompanying drawings, when considered in conjunction with the subsequent, detailed description, in which:

FIGS. 2a and 2b are listings of a portion of an annotated, formatted, tokenized sample text data file for use with the system of the invention;

DETAILED DESCRIPTION OF THE PREFERRED EMBODIMENT

The present invention provides a data processing and analysis "engine" that includes a complete method for storing, viewing and automatically parsing and analyzing complex experimental data stored in text files. This is accomplished within a single workspace (window) using top-down computational flow and the computed results of interest are displayed in a flexibly configured, common viewing (focus) region. The focus region can contain any information the user desires, including but not limited to: an interactive view of the raw data from a particular file, specific fields from one or more data files, comments, an arbitrary number of computed results, multiple graphs, and tables. The focus region may be enlarged to cover most of the available screen viewing area. Automated processing may be enabled by updating a file selection index or making a change to an analysis algorithm.

The analysis engine of the invention also provides methods for semi-automatic or fully-automatic processing multiple data files and viewing of results of such an analysis without switching windows or changing the viewing (focus) location in the whitespace. Results of the automated processing of the data files may be easily transferred from the focus region directly into reports by means of simple copy and paste operations.

Figure 1:
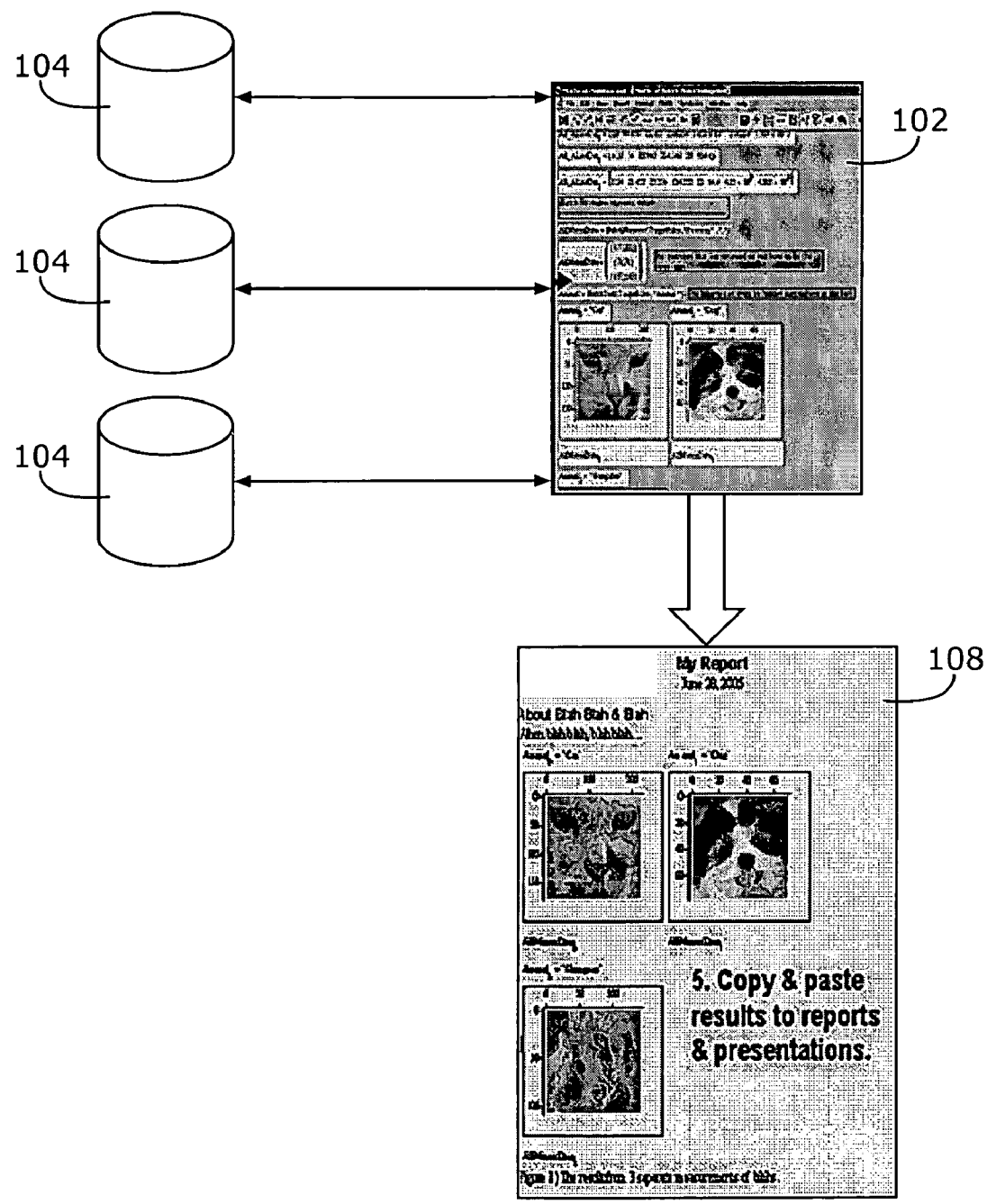
FIG. 1 is a schematic, functional, pictorial block diagram of the system of the invention.

Referring first to FIG. 1, there is shown a functional schematic diagram of the inventive system level system flow chart, generally at reference number 100. Central to the structure and operation of the system of the invention is a "whiteboard" and data analysis functions 102 that are provided by a third party. The present invention provides functions that allow a series of text data files 104 to be viewed within that whiteboard. In addition, using functions of the inventions, various fields may be parsed from those data text files 104 and imported directly into named variables in that whiteboard 102 for the purposes of analysis. Consequently, there is no need for any additional third-party software as the entire operation of parsing, processing and viewing is handled within a single white-board style interface. In the embodiment chosen for purposes of disclosure, the whiteboard is Mathcad as supplied by Mathsoft. However, it will be recognized that other possible whiteboards may be supplied by other vendors or that a suitable whiteboard could be supplied as a portion of the inventive system. Consequently, the invention is not limited to the Mathcad whiteboard chosen for purposes of disclosure. Rather, the inventive process may be performed on any suitable whiteboard. This system and method of the present invention makes it possible to store and parse complex data files into that whiteboard. Finally, results from the whiteboard 102 may be copied and pasted into a report 108 by simple methods.

Whiteboard 102 represents a unified graphics work area (i.e., a user interface) named for its traditional, wall-mounted counterpart. In a Microsoft Windows® implementation of the invention, whiteboard 102 is a single window. Because all file parsing, data analysis, and graphical presentation activity is initiated and controlled from whiteboard 102, a user is not distracted by switching screens, changing to other software tools having different program interfaces, or other inconsistencies typically encountered in using many software tools to eventually create a report from raw experimental data.

Text files 104 represent multiple complex and possibly diverse text data files presumed to contain experimental test data. Such data files 104 may contain many entries of diverse data types, which are individually identified and, preferably, identified by a unique, descriptive token. This allows visual inspection of any data entry in any data file 104 at any time with a simple textfile viewer, not shown. An automatically updating text viewer, may be embedded within whiteboard 102, thereby allowing data file 104 inspection without removing focus.

During data analysis, data importation routines can scan one or more data files 104 for the token and transfer a data field associated with that token directly into a named variable in the workspace (i.e. parse the data directly from the files). This data transfer method avoids the problems of indirect association of data from the file with variables in the workspace discussed hereinabove. While general text parsing commands are provided as a part of the present invention, optimum file processing (i.e., parsing) occurs when data files 104 are organized in a predetermined manner. For example, assigned tokens are preferably placed at the beginning of a new line and followed by the data fields associated with the token.

High parsing efficiency may be obtained whenever possible, by locationally restricting all tokens to the first position on each physical line in data file 104. When such a uniform structure is provided, the parser need only search the first position in each line for a desired token. If found, the line may be further processed. If, however, the token is not found, the parser may quickly move on to the next line in data file 104. The same ease-of-use is enabled when visually inspecting the data files while attempting to locate specific data fields within the text file. In data file 104 without such an organization, the parser or the user must completely search each line for a desired token. It will be recognized that such searching will be more time consuming for both the parser and the user than when the data file is organized in the manner described hereinabove.

Referring now to FIG. 2, there is shown a portion of an exemplary, annotated data file, similar to data files 104 (FIG. 1) and having the previously-described organization, generally at reference number 130. While numerous data types may be seen in file portion 130, each is an example of a data type commonly found in text data files 104 in the research and development environment. Data regions are preferably separated by white space so that a user may easily scan a large text file and readily identify groupings of data regions and tokens associated with each separate data region. In the example file fragment 130, data is laid out in an aesthetically pleasing and easily readable format.

Multiple data entries on a line should also be delimited by a non-alphabetic, non-numeric text character. In data file segment 130, a comma is used. It will be recognized that many other characters could be substituted therefor.

In file segment 130, several data regions are identified. These include header information 132, hardware information 134, and then data regions 136-150. Each of the identified data regions 136-144 and 150 exemplifies several data types typical in a text data file 104. These include string matrices 136, a string vector as a row 138, a string column 140, a numeric vector as a row 142, numeric vector as a column 143, and embedded number and text data 144. Regions 136-144 are placed in this data file in arbitrary locations simply to illustrate that the various tokenized fields may be located anywhere in the data file. Regions 146 and 148 provide information on how the measurement was performed. Finally, region 150 is the raw measurement data obtained from the measurement system which happens to be a matrix of data. There is an advantage in placing a token such as "Position," in region 150 at the start of each new row of elements because it makes it easier for the user to identify the length of the data in each row and the start of a new row in the matrix. Included within data regions 136-150 are informative text, text data, scalar data, several different types of vector data (column and row), matrix data and a line of embedded text tokens and numerical data. The data in each field may be actual text or numeric values represented as text.

The parsing commands of the present invention, described in detail hereinbelow, may be used to process data files 104 that are organized as exemplified in file portion 130. There are six commands provided that may be used to parse either single or multiple text data files 104.

Two commands are for handling filenames. A first command, GetFiles, returns the names of all files in a specified directory as a vector of filenames. The second command is FileTypeLists, that sorts a provided vector of file names and produces a new vector containing the sorted filenames.

Two commands are provided for parsing and importing data from a single file into a single named variable; the GetNumeric command parses and imports numeric data stored as text; the GetText command parses and imports text data. Both commands are functionally identical except that the GetNumeric command converts each element into a number and the GetText command returns each element as text. Neither command requires a priori knowledge of whether the data is a scalar, a row-wise vector, a column-wise vector or a matrix. Both commands require the specification of an identifying token to locate the data in the data file.

Two commands are provided for parsing and importing data from multiple files into a single variable; the BatchNumeric command parses and imports numeric data stored as text; the BatchText command parses and imports text data. Both commands are functionally identical except that the numeric command converts each element in each data file into a number and the text command just returns each element as text. Neither command requires a priori knowledge of whether the data is a scalar, a row-wise vector, a column-wise vector or a matrix. Neither command requires that the data imported from each file have the same number of dimensions nor that the number of entries in each dimension be the same in all files. Both commands require the specification of an identifying token to locate the data in the data files.

The present invention further provides a global index that may be located in the focus region on the workspace. This index may be updated by manually entering a value into the index on the whiteboard or by use of an event such as a keypress. After updating this global index, automatic file processing is initiated on all computations using the data file indicated by the updated index value.

Several examples illustrating the use of theses six commands are now provided. The illustrations use MathCad notation wherein the command to assign data to a variable is denoted by the operator ":=" and the command to display the contents of a variable is denoted by the operator "=". In some illustrations, commands written in VBscript 5.6 are called from within MathCad. While VBScript 5.6 has been used purposes of disclosure, other languages such as C may be used to develop the same operations for data file parsing and substituted therefor.

FILENAME HANDLING: GetFiles

It is often useful to create a list of filenames or filename paths by reading all the filenames from a particular directory and returning the result in the form of a column vector:

Syntax: AllFiles:=GetFiles(Directory)

Action: Get all filenames in a directory and return them in a vector.

$$Directory \equiv "C: \backslash MyDirectory \backslash"$$

$$AllFilesList := AllFiles(Directory)$$

$$AllFilesList =$$

$$\begin{pmatrix} \text{"swirlies.gif"} \\ \text{"TestEarth3.gif"} \\ \text{"TestFile1.txt"} \\ \text{"TestFile2.txt"} \\ \text{"TestFile3.txt"} \\ \text{"testPic.bmp"} \\ \text{"testPicOutline.bmp"} \\ \text{"TextFileFrame.html"} \\ \text{"TextParse.html"} \\ \text{"Unreal.gif"} \\ \text{"U\_S\_Copyright Office-Copyright Basics(Circular1).mht"} \end{pmatrix}$$

FILENAME HANDLING: FileTypeList

Syntax: DataFiles:=FileTypeList(AllFilesList, Extension)

Action: Sort out all of the files in AllFilesList that end with the extension. If no files are found then return the single element vector with an empty string for the filename.

EXAMPLES

DataFiles :=
FileTypeList(AllFilesList,".txt.")

RefFiles :=
FileTypeList(AllFilesList,".ref")

$$DataFiles = \begin{pmatrix} \text{"TestFile1.txt"} \\ \text{"TestFile2.txt"} \\ \text{"TestFile3.txt"} \end{pmatrix}$$

RefFiles = ("  ")

Figure 3:
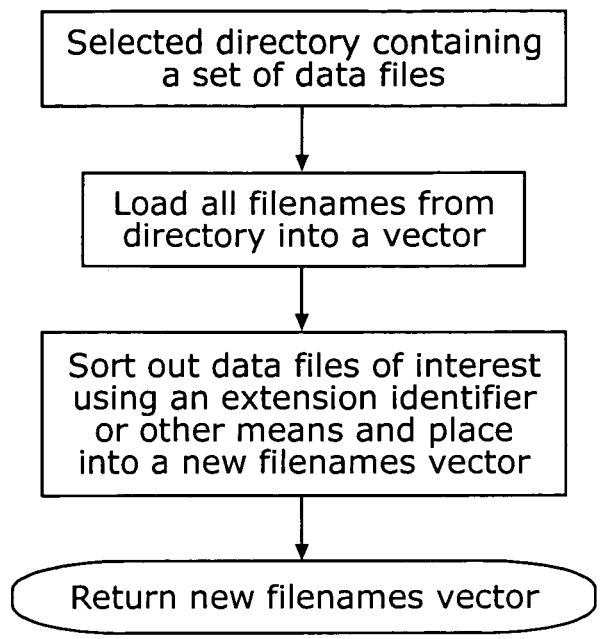
FIG. 3 is a flowchart of the operation of the GetFiles and FileTypeList commands of the system of the invention.
Figure 4:
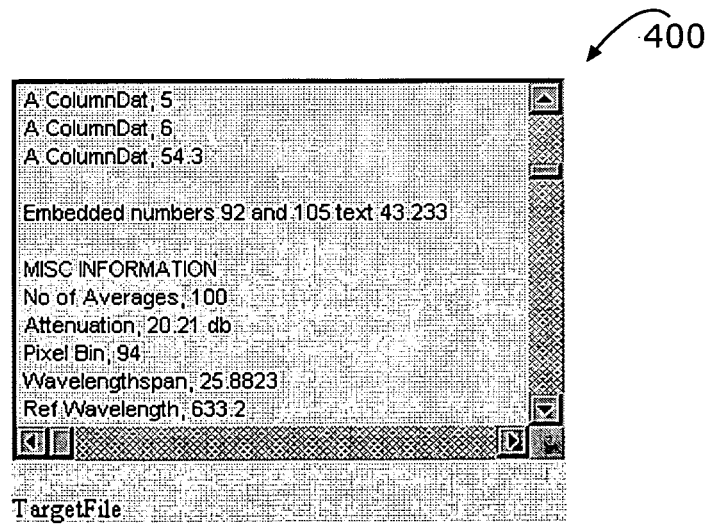
FIG. 4 is a schematic view of a raw text viewing window which may be embedded in the whiteboard interface in accordance with the invention.

Referring now to FIG. 3, there is shown a flowchart of the operation of the GetFiles and FileTypeList commands. In many data analysis operations viewing raw data from text data files is important. Consequently, the system of the invention incorporates a raw file viewing utility 400 as part of the whiteboard 102 environment. To use the utility, a user selects a particular target file by selecting the file by its index number from a vector of file names generated by the GetFiles and FileTypeList commands. The selected target file is automatically opened and text from the file is loaded into a scrollable window 400 within the workspace. This gives the user the ability to inspect the contents of the currently selected or processed raw data file without opening additional windows or otherwise changing focus from the workspace.

SINGLE FILE DATA IMPORT: GetText

Syntax: Varname:=GetText(TargetFile, TokenString, Delimiter)

Action: A user selects a desired target file from the vector of files names using the target file's index. The TargetFile is opened and a search is conducted through the target file for all occurrences of the TokenString (i.e., the desired token) as the leftmost text entry on the line. If one token is found in the data file and a subsequent delimiter is not found, then the GetText function returns all text data located after the token as a single string. If one token is found in the data file and there is more than one text entry in the row where each entry is separated by the delimiter, then the function will return a row-wise vector of text data. If tokens are found on each of multiple lines but there is only one text entry per line, then the function returns a column-wise vector of text data. This allows for arbitrary lengths for each and every row-wise and column-wise vector without the need for a priori knowledge of the number of entries for the vectors or the vector orientation (row-wise or column-wise). If more than one row-wise vector of text data is contained in multiple lines (each starting with TokenString), then a matrix of text data is returned.

Example 1

TargetFile:=concat(Directory, DataFiles$_p$)

TargetFile="C:\MyDirectory\TestFile1.txt"

CreationDate:=GetText(TargetFile, "Date Time Created,", "*")

CreationDate="10-May-2004 9:23:32 PM"

Note that the data variable CreationDate is directly associated with the text data that follows the token identifier "Date Time Created" in the data file. In the example above "*" is used as the delimiter because "*" is known to otherwise never be written into the data line. In that case no delimiter is found on the line during the search and the entire line after the token is returned as a single (scalar) text string.

Example 2

StringVecRow:=GetTex(TargedFile, "A StringRow,", ";")

StringVecRow=("These" "Can Be" "Headers" "For Your Columns")

StingVecColumn:=GetText(TargetFile, "A StringColumn,", ";")

$$StringVecColumn = \begin{pmatrix} \text{"These"} \\ \text{"Can Be"} \\ \text{"Headers"} \\ \text{"For Your Rows"} \end{pmatrix}$$

StringMatrix:=GetText(TargetFile, "String Matrix,", ";")

$$StringMatrix = \begin{pmatrix} \text{"This"} & \text{"is"} & \text{"the First"} & \text{"Row"} \\ \text{"This"} & \text{"is"} & \text{"the Second"} & \text{"Row"} \end{pmatrix}$$

DidntFind:=GetText(TargetFile, "Rumplestiltskin,", ";")

Didtind=

The GetText command gives the user the ability to program more general parsing algorithms for use with files that have tokens and data which are imbedded within lines of the text data files and not just at the start of each line. This is similar to the programmatic functionalities of the text data file parsing command provided by Mathematica and also the parsing profiles provided by Parsing Tool.

Parsing data lines with embedded tokens may require creative use of the string comparison and number conversion functions in order to match the user's method for writing data to each file. In MathCad, these programmatic statements can be developed as native functions that use the substr, strlen, str2num, and other similar commands and functions provided by the MathCad analysis package. These programming statements may then take the output of the GetText command as an input and return the parsed result. While embedded tokens can be handled by the parsing method of this invention, the general practice of embedding tokens in the data files should be avoided as it increases the search and parse time overhead and decreases parsing speed.

In contrast to Parsing Tool, the present invention has the advantage of being developed using analysis functions that originate from a single analysis software package and from within the same workspace (i.e., whiteboard 102).

The more general parsing commands that may be developed by the user may also be saved in a common file and referenced using MathCad's "insert" reference file functionality, which is the similar to the "include" statement of C languages, MatLab and Parse Tool. Consequently, the file parsing functionalities of Parse Tool and Mathematica may be implemented in MathCad using the functions of the present invention.

An example of parsing embedded text from the file portion 144 (FIG. 2) is provided.

```
PrsEmb(EmbDat, Keyword, Delim) :=
    TknLc ← search(EmbDt, keyword, 0)
    if TknLc ≠ −1
        temp ← substr(EmbtDt, Tknlc_strlen(Keyword), strlen(EmbDat))
        DelimLoc ← search(Temp, Delim, 0)
        Temp ← substr(Temp,0, DelimLoc) if DelimLoc ≠ −1
        return str2num(Temp)
    return ∞ otherwise
EmbedDat := GetText(TargetFile,"Embedded","*")
EmbedDat = "numbers 92 and 105 text 43.233"
PrsEmb(EmbedDat,"numbers "," ") = 92
PrsEmb(EmbDat. "and "," ") = 105
PrsEmb(EmbedDat,"text "," ") = 43.233
```

SINGLE FILE DATA IMPORT: GetNumeric

Syntax: Varname:=GetNumeric(TargetFile, TokenString, Delimiter)

Action: A user selects a desired target file from the vector of files names using the target file's index. The TargetFile is opened and a search is conducted through the target file for all occurrences of the TokenString (i.e., the desired token) as the leftmost text entry on the line. The GetNumeric function then returns the resulting data located after TokenString as a numeric value. If one token is found in the data file with only one entry in the data field, then GetNumeric returns a scalar. If one token is found in the data file and there is more than one entry separated by the delimiter then GetNumeric returns a row-wise vector of numeric values.

If tokens are found on each of multiple lines but there is only one numeric entry per line, then GetNumeric stacks the numeric data and returns a column-wise vector of numeric values. This allows for arbitrary lengths for each and every row-wise and column-wise vector without the need for a priori knowledge of the number of entries for the vectors or the vector orientation (row-wise or column-wise). If more than one row-wise vector of data is contained in multiple lines, then, GetNumeric returns a matrix of numeric data.

EXAMPLES

A scalar is returned by GetNumeric from a single entry in the file:

P EmployeeIDNumber:=GetNumeric(TargetFile, "EmployeeID,#", ";")

EmployeeIDNumber=12345678

A row-wise vector is returned by GetNumeric from a single line entry of multiple numeric entries that are comma delimited in the file:

RowVectorData:=GetNumeric(TargetFile, "A LineDat", ";")

RowVectorData=(34 99.456 23.453 234.234 . . . 55690)

ColVectorData:=GetNumeric(TargetFile, "A ColumnDat,", ";")

$$ColVectorData = \begin{pmatrix} 4 \\ 5 \\ 6 \\ 54.3 \end{pmatrix}$$

MatrixData:=GetNumeric(TargetFile, "Position,", ";")

$$MatrixData = \begin{pmatrix} 105 & 107 & 109 & 111 & 113 & 115 & \cdots \\ 103 & 106 & 108 & 110 & 113 & 115 & \cdots \\ \cdots & \cdots & \cdots & \cdots & \cdots & \cdots & \cdots \end{pmatrix}$$

In the case of a line of data values, specifying the correct delimiter is important because it separates the data values.

The parsing method provided by the GetNumeric and GetText commands is capable of importing standard comma separated variable (csv) files, space delimited (prn) files, and tab delimited data files which contain only data and no other information. In those cases, the files should not contain any text or comments, only text or numeric values stored as text data. The TokenString is defined to be the empty string "" and the delimiter FFDelim is the comma ",", the space " " or the tab character. The following command handles any of the fixed format cases for files that contain only data and no tokens.

FixedFormat:=GetNumeric(TargetFile, " ", FFDelim)

$$FixedFormat = \begin{pmatrix} 105 & 107 & 109 & 111 & 113 & 115 & \cdots \\ 103 & 106 & 108 & 110 & 113 & 115 & \cdots \\ \cdots & \cdots & \cdots & \cdots & \cdots & \cdots & \cdots \end{pmatrix}$$

The user may still take advantage of the automated data file processing aspect of the invention, although each file will only be able to contain a single data field entry.

Figure 5:
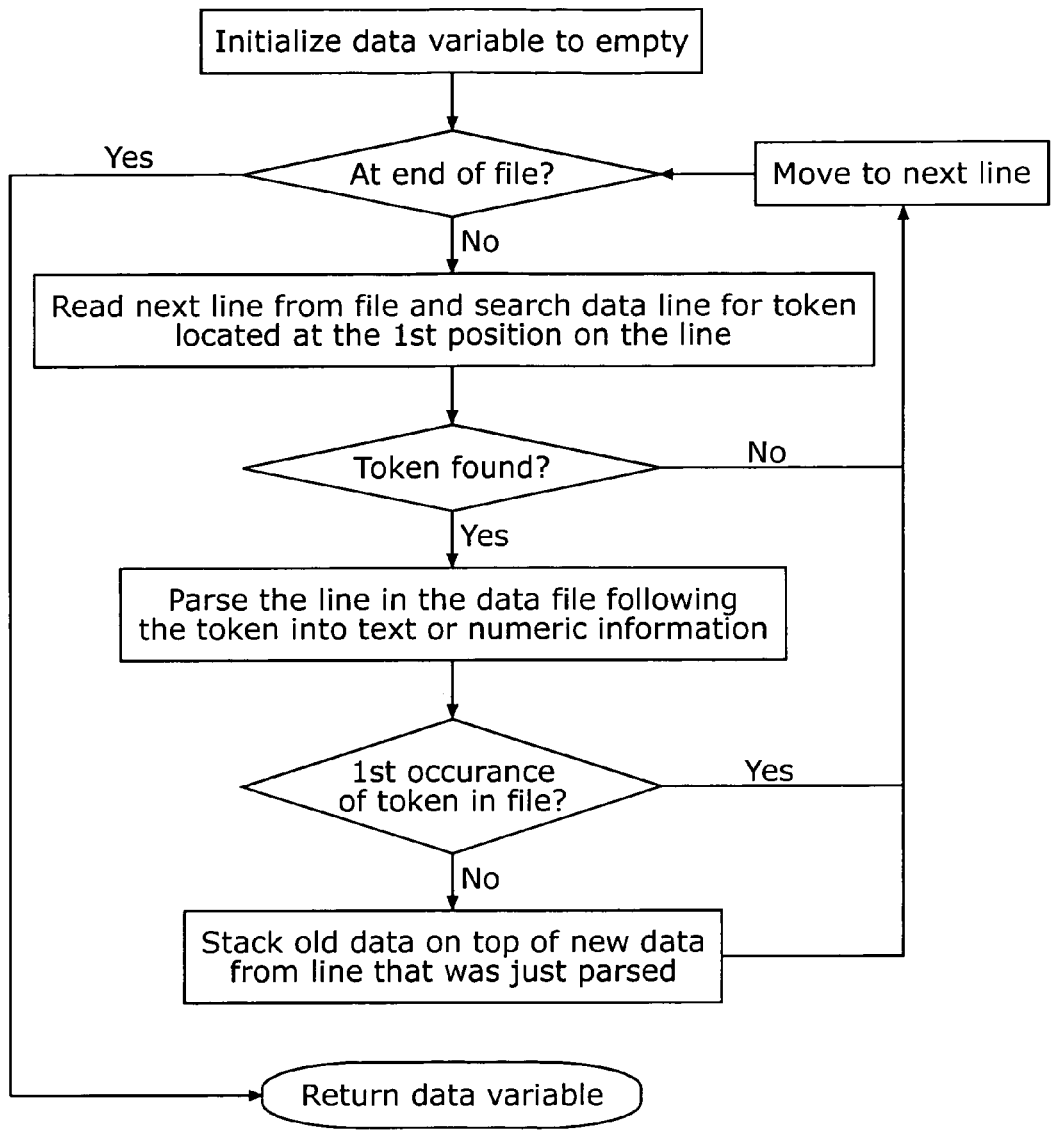
FIG. 5 is a flowchart of the operation of the GetText and GetNumeric commands of the invention.

A Flowchart of the two single file parsing commands GetText and GetNumeric is shown in FIG. 5.

These four commands: AllFiles, FileTypeList, GetText, and GetNumeric are structured such that the user need not have any a priori knowledge of the contents and/or format of the data in the file, with the exception of knowing that the data items of interest are labeled with a specific token identifier at the start of each data line and that values are separated by a specific delimiter. These commands, in combination with the pre-defined convention for writing tokenized data files, allows high speed text data file parsing and the direct association of a named variable in the workspace with any form of data (i.e., scalar, row-vector, column-vector or matrix) in the file.

Figure 6:
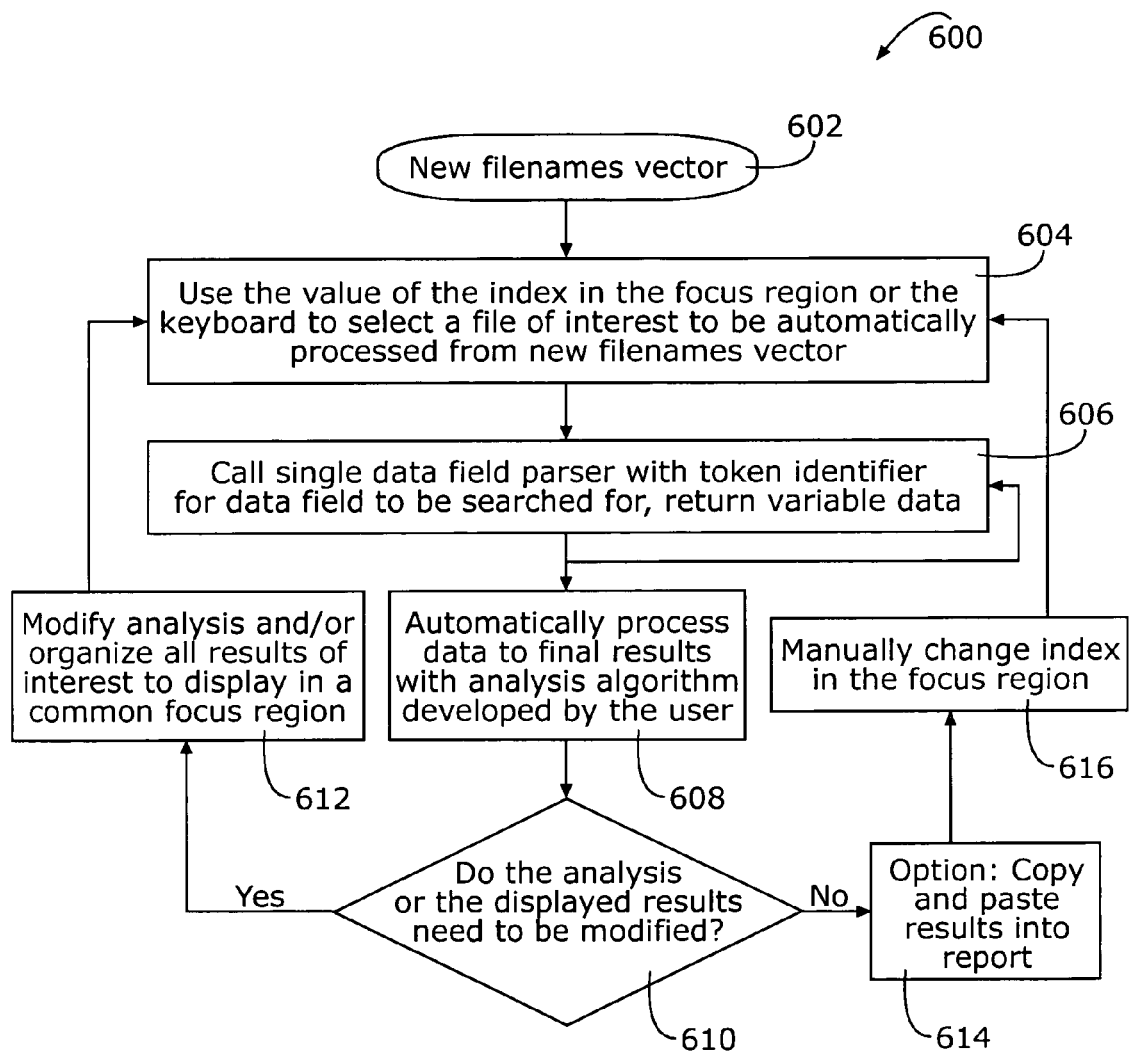
FIG. 6 is a flowchart of the semi-automatic processing of single data files from a set of multiple data files using the system of the invention.

Referring now to FIG. 6, there is shown a flowchart 600 of the process of the present invention whereby a user may set up and modify an analysis in the workspace during the algorithm development phase. Once a list of data files 602 has been provided as described hereinabove, the user may use the index to select and automatically process a file of interest, block 604. The GetText or GetNumeric functions (i.e., single field parsers) are called repeatedly, block 606 until all data fields of interest have been parsed and extracted into named variables from the file. Data fields that are not of interest are not parsed and are not loaded into the analysis program, which saves storage space (e.g., RAM) and decreases data processing time. A user-developed analysis algorithm is then used to automatically process the extracted data, block 608. The user must then determine if the analysis meets his or her requirements, block 610. If the analysis needs to be modified, block 612, suitable modifications are made, block 612, and control is transferred to block 604. If, however, the resulting analysis is acceptable, block 610, the user, optionally, may paste any result of interest into a report, block 614. The user may then select another text data file of interest using the index, block 616. Control is again transferred to block 604.

It should be remembered that all operations shown in flowchart 600 take place without change of focus because of the implementation of a whiteboard-like GUI 102 of the present invention. The inventive system allows a user to rapidly inspect experimental results contained in multiple text data files without changing focus. Consequently, distraction of the user performing data analysis is minimized.

Figure 7A:
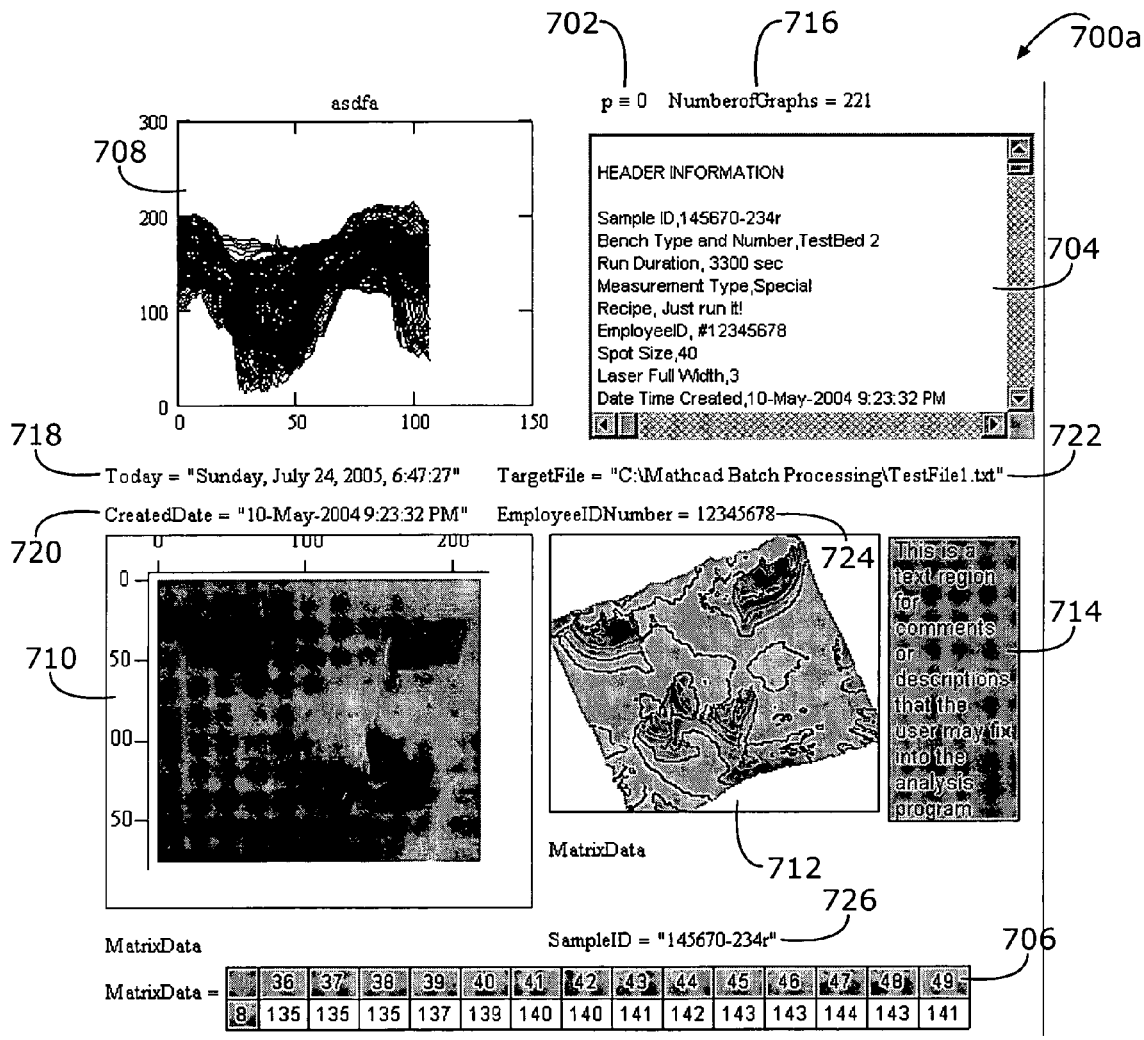
FIGS. 7a and 7b are schematic representations of the user-configurable results portions of the graphical user interface of the invention showing results after semi-automatically processing two different single data files, respectively by updating of a file selection index.
Figure 7B:
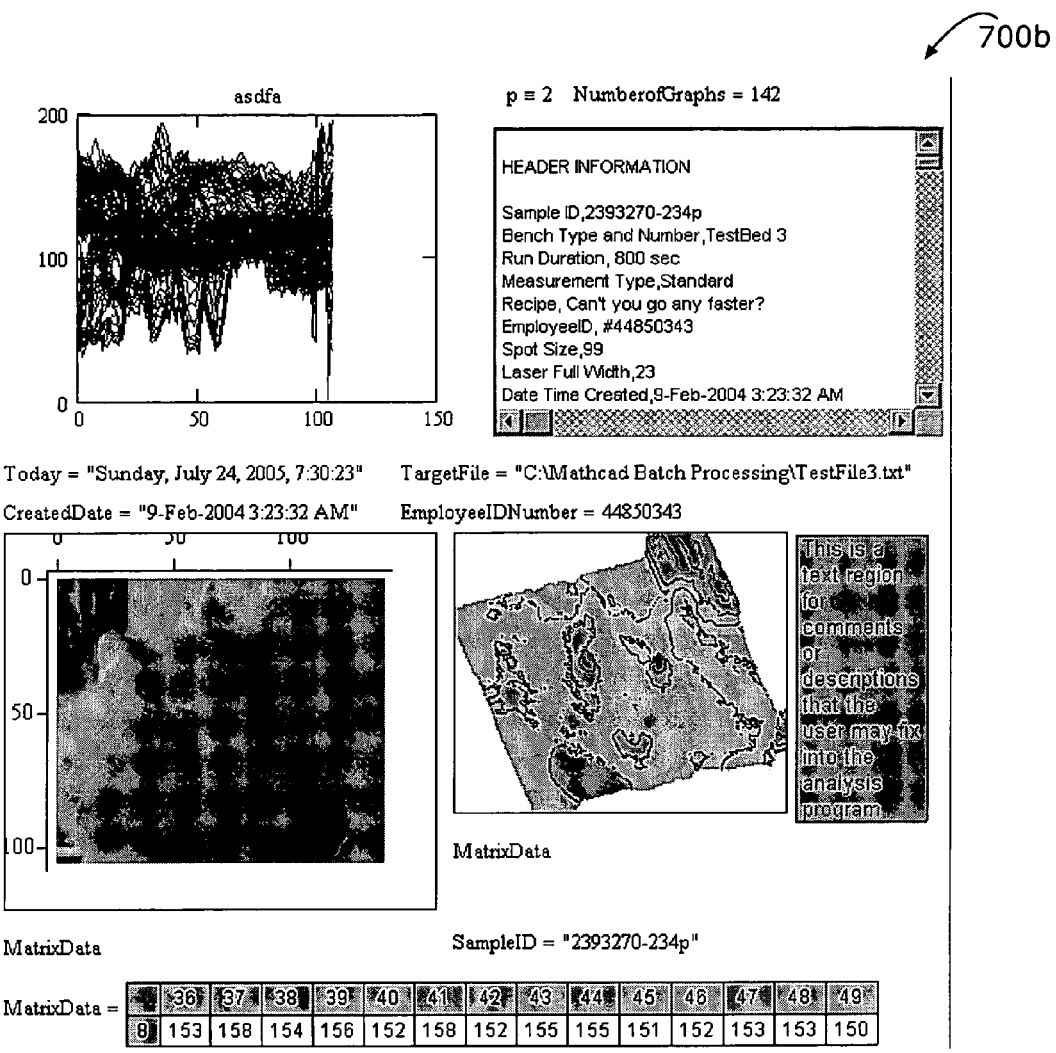

Referring now to FIGS. 7a and 7b, there are shown two examples of user-configurable results regions 700a, 700b, respectively, of whiteboard GUI 102. In FIG. 7a, a user has chosen to display a global file selection index set to p=0, reference number 702, a scrollable text data file viewer 704, a spreadsheet-style cell value viewer 706, a 2-D graph of multiple 1-D arrays 708, a 3-D grayscale graph of matrix data 710, a rotated topographic map 712 of the same 3-D matrix data, a text comment region 714, and multiple display fields including: 'NumberofGraphs' 716, 'Today' 718, 'CreatedDate' 720, 'TargetFile' 722, 'EmployeeIDNumber' 724, and 'SampleID' 726.

Changing the global file section index 'p' causes the program to automatically parse the data from the data file indexed in the TargetFileNames vector and process all related outputs in the workspace without the user needing to change focus from the results region 700a.

FIG. 7b shows a results region 700b similar to results region 700a but associated with a global file section index of 'p=2'. The workspace has been processed automatically and all related outputs in the results region have been updated without any additional action by the user and without the user needing to change focus from the results region. No a priori knowledge of the data layout in either file associated with index p=0 or p=2 is needed, other than that each data field in the files is identified by the same token and uses the same delimiter. The results in FIGS. 7a and 7b may be selected all at once from the focus region and then copied and pasted into any document using a simple computer pointing device selection method.

When analyzing multiple files simultaneously, a convention for indexing imported data from the same field located in multiple files and imported into a single named variable is required. Such indexing is most intuitive when both the filenames of the files to be processed and the data from the files are stored in separate column-wise vectors of equal length. The convention is that the index of the data imported into the named variable vector (e.g., "A") is same index in the filenames vector (e.g., "Filenames") from which that data originated. The entries in the named variable vector can be scalars, vectors, or matrices of text or numeric data.

$$FileNames_i = \begin{pmatrix} FileNames_0 \\ FileNames_1 \\ \cdots \\ FileNames_N \end{pmatrix} \equiv \overrightarrow{FileNames},$$

where there are N+1 filenames in the FileNames vector. In the named variable vector, there will be N+1 entries, $$A_i = \begin{pmatrix} A_0 \\ A_1 \\ A_2 \\ \dots \\ A_N \end{pmatrix} \equiv \vec{A}$$

which are directly associated with each of the N+1 data files.

The possible duality of function for the column vectors from a single data file and an array of scalar values from multiple files may be easily handled if the data file parsing commands are of two distinct names, such as "GetNumeric" and "BatchNumeric". GetNumeric is for use when only a single file, possibly with multiple entries is being analyzed. BatchNumeric, on the other hand, is used for batch file processing of multiple text data files. A user may differentiate a named variable receiving column data from a single file from a named variable receiving data from multiple files by using a variable naming convention that clearly indicates whether the data is from single or multiple files. One such convention is to simply append "Batch" to the chosen variable name when the data in the directly associated variable name contains data that originates from multiple files (i.e., was extracted by the BatchNumeric function).

When performing batchfile processing, row-wise vectors may be read and extracted from the N+1 data files in the filenames vector and stored in the named variable A as:

$$\vec{A}_i = \begin{pmatrix} \begin{pmatrix} A_{0,0} & A_{0,1} & A_{0,2} & \cdots & A_{0,M} \\ A_{1,0} & A_{1,1} & A_{1,2} & \cdots & A_{1,M} \\ \cdots & \cdots & \cdots & \cdots & \cdots \\ A_{N,0} & A_{N,1} & A_{N,2} & \cdots & A_{N,M} \end{pmatrix} \end{pmatrix} \equiv \begin{pmatrix} \vec{A}_0 \\ \vec{A}_1 \\ \dots \\ \vec{A}_N \end{pmatrix}$$

Each of the vectors $\vec{A}_i$ corresponds to a row-wise vector of values from data file i. It is more correct to represent this two-dimensional matrix of values as a vector of vectors rather than a matrix because the data in each row-vector originated from different data files and each vector and may therefore have a different number of elements 0 . . . M, 0 . . . M', etc. In contrast, the reading of multiple entries of row-wise vectors from a single file into the same variable is to be represented as a standard definition matrix:

$$A_{i,j} = \begin{pmatrix} A_{0,0} & A_{0,1} & A_{0,2} & \cdots & A_{0,M} \\ A_{1,0} & A_{1,1} & A_{1,2} & \cdots & A_{1,M} \\ \cdots & \cdots & \cdots & \cdots & \cdots \\ A_{N,0} & A_{N,1} & A_{N,2} & \cdots & A_{N,M} \end{pmatrix} \equiv \overline{\overline{A}}.$$

A column vector $\vec{A}$, when read from a single file, will be stored as a column vector of column vectors when reading from multiple files, as:

$$\vec{A}_i = \begin{pmatrix} \begin{pmatrix} A_0 \\ A_1 \\ A_2 \\ \dots \\ A_M \end{pmatrix}_0 \\ \begin{pmatrix} A_0 \\ A_1 \\ A_2 \\ \dots \\ A_{M'} \end{pmatrix}_1 \\ \begin{pmatrix} A_0 \\ A_1 \\ A_2 \\ \dots \\ A_{M'} \end{pmatrix}_2 \\ \begin{pmatrix} \dots \\ \dots \\ \dots \\ \dots \\ \dots \end{pmatrix} \\ \begin{pmatrix} A_0 \\ A_1 \\ A_2 \\ \dots \\ A_{M''} \end{pmatrix}_N \end{pmatrix} \equiv \begin{pmatrix} \vec{A}_0 \\ \vec{A}_1 \\ \vec{A}_2 \\ \dots \\ \vec{A}_N \end{pmatrix}$$

where there are N+1 data files.

The number of entries in each of the column or row vectors imported from each of the data files is not required to be the same. Hence the first vector from the first file may contain M=5 elements, the second M'=2 elements, the third M''=3 elements, the fifth M'''=17 elements, etc.

In the case when a matrix of data is returned from each data file, the batchfile processing command returns a column-wise vector of matrices. The matrix that is indexed as position "i" in that vector of matrices will correspond to the file number "i" in the column-wise filenames vector.

$$\vec{A}_i = \begin{pmatrix} \overline{\overline{A}}_0 \\ \overline{\overline{A'}}_1 \\ \overline{\overline{A''}}_2 \\ \dots \\ \overline{\overline{A'''}}_N \end{pmatrix}$$

The primes denote the fact that each matrix in the array of matrices need not have the same size, i.e. each matrix in the array may have dimensions with an arbitrary number of elements.

With the adoption of such conventions for importing data from multiple files into a single variable, it is possible for the user to learn the protocol for accessing data elements once and then the process becomes intuitive.

In order to use batchfile processing, a column-wise vector of file paths must first be created from the list of data files. This may be accomplished as follows:

$$TargetFiles := \overrightarrow{concat(Directory, DataFiles)}$$

$$TargetFiles = \begin{pmatrix} \text{"C:\textbackslash MyDirectory\textbackslash TestFile1.txt"} \\ \text{"C:\textbackslash MyDirectory\textbackslash TestFile2.txt"} \\ \text{"C:\textbackslash MyDirectory\textbackslash TestFile3.txt"} \end{pmatrix}$$

Syntax: Varname:=BatchText(TargetFiles, TokenString, Delimiter)

Action: The BatchText command takes the column-wise vector of target file names, the token to be searched for, and a delimiter as arguments. The BatchText function calls the single file GetText function, which then opens file "i", extracts the text field(s) in the file that are associated with the token, and returns the text results. BatchText repeats this operation for every file in the TargetFiles vector, placing the text data from file number "i" into the named variable at the column vector array position "i".

The index of the text file in TargetFiles from whence the data originated corresponds to the same the index in the vector of text values that is returned into the named variable. This allows the user to do two important things. First, similar information from many data files may be parsed and grouped into a single vector. Second, the user may easily identify which data entry in the vector came from which file, as the file and the data will have the same index in both vectors. Hence the user may readily track the data element in the vector.

BatchRefFiles:=BatchText(TargetFiles,"ReferenceFile,", "*")

$$BatchReFiles = \begin{pmatrix} \text{"Reference11.dat"} \\ \text{"Reference23.dat"} \\ \text{"Reference102.dat"} \end{pmatrix}$$

In this example, the text files "TestFile1.txt", "TestFile2.txt", and "TestFile3.txt" each have a "Reference File" token in them and the text that follows those tokens is "Reference11.dat", "Reference23.dat", and "Reference102.dat", respectively.

BatchWavelengthText:=BatchText(TargetFiles, "Wavelength,", "*")

$$BatchWavelengthText = \begin{pmatrix} \text{"633.2"} \\ \text{"532"} \\ \text{"488"} \end{pmatrix}$$

In this example, the BatchText function has searched through each of the target files for the token "Wavelength," and has returned the data as a column of text values. Each element of BatchWavelengthText corresponds to the same element in the TargetFiles vector from which that data originated.

This method of batchfile processing data is quite general. The number of occurrences of tokens in each data file need not be the same. The user does not have to specify either the dimensions of the data entry field or the number of elements in each dimension. In the next example, the second data file has two "EmployeeID," fields (for whatever reason) and the other two files only have one. In this example, the data file parsing methodology of the present invention has made it possible to easily discover this "anomaly" and to view all entries.

BatchEmployees:=BatchText(TargetFiles, "EmployeeID,", "*")

$$BatchEmployees = \begin{pmatrix} \text{"#12345678"} \\ \{2, 1\} \\ \text{"#44850343"} \end{pmatrix}$$

$$BatchEmployees_1 = \begin{pmatrix} \text{"#14522365"} \\ \text{"#99999999"} \end{pmatrix}$$

It should be noted that Mathcad displays the dimensionality of a vector or matrix in curly brackets {,} when that vector or matrix is an element of another vector or array.

Syntax: Varname:=BatchNumeric(TargetFiles, TokenString, Delimiter)

If a user wishes to batchfile process multiple files and have numeric data returned, then the BatchNumeric function may be used.

BatchWavelengthNum:=BatchNumeric(TargetFiles, "Wavelength,", "*")

$$BatchWavelengthNum = \begin{pmatrix} 633.2 \\ 532 \\ 488 \end{pmatrix}$$

In this example, a scalar numeric value is returned for each data file in the TargetFiles vector and each of those scalar values occupies the corresponding index position in the BatchWavelengthNum column vector.

In the case where a data field in each file consists of a vector of numeric data along a row, the batch file processing command produces a column array of 1-D row arrays. Each row of data returned has the same row index as the file in the TargetFiles list. In this example, $AllLineDat_0$ has the "A LineDat" data from "TestFile1.txt", $AllLineDat_1$ has the "A LineDat" data from "TestFile2.txt", etc.

AllLineDat:=BatchNumeric(Target Files, "A Line Dat,", ",")

$$AllLineDat = \begin{pmatrix} \{1, 7\} \\ \{1, 6\} \\ \{1, 8\} \end{pmatrix}$$

$AllLineDat_0$=(34  99.456  23.453  234.234  2.452×$10^3$ . . . 5.569×$10^4$)

$AllLineDat_1$=(4.32  54  23.945  234.234  22  984.4)

$AllLineDat_2$=(5.54  23.432  23.254  534.232  22  94.4  4.85×$10^3$  4.585×$10^3$)

Note that there is no requirement that the number of entries along each row in different files be the same.

A Batch command returns an array of matrices if the data fields in the files contain matrix data.

Figure 8:
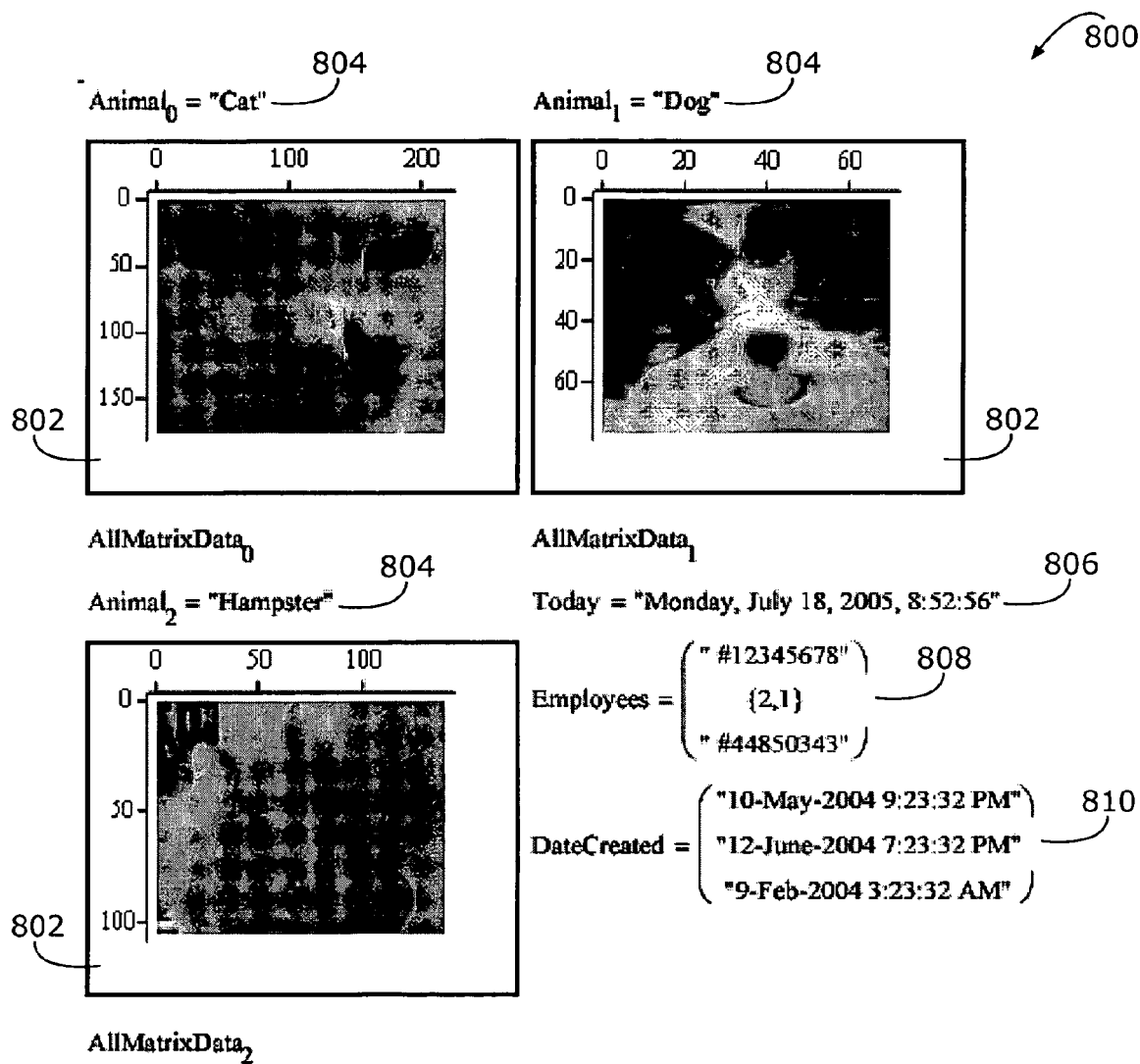
FIG. 8 is a schematic representation of a user-configurable results portion of the graphical user interface showing a result of processing multiple data files via batch processing.

Referring now to FIG. 8, there is shown a user-configurable results region 800 of whiteboard GUI 102 containing results obtained using batch parsing commands of the present invention. The multiple results were batchfile parsed and processed from three separate data files. The method of associating the names of the files and the variable data by use of the same index in both vectors makes it easy to always know what data originated from which file. Hence regions of named variables and plots may be grouped together in the focus region intuitively, just by the fact that they have the same associated index. Focus Region 800 contains matrix data parsed from multiple text files, processed using the same algorithms and plotted (i.e., plot 802) in the same focus region. Also displayed and grouped with the matrix data are the name identifiers that were parsed from the associated data files using another token and directly associated with the name column vector variable (e.g. "Animal") 804. Also displayed and grouped in the focus region are the current date 806, the employee IDs 808 of those who made each of the measurement files, and the date that each of the raw data files were created 810. As previously discussed, all data from results in the focus region 800 may readily be placed in a report using well known copy and paste techniques.

Figure 9:
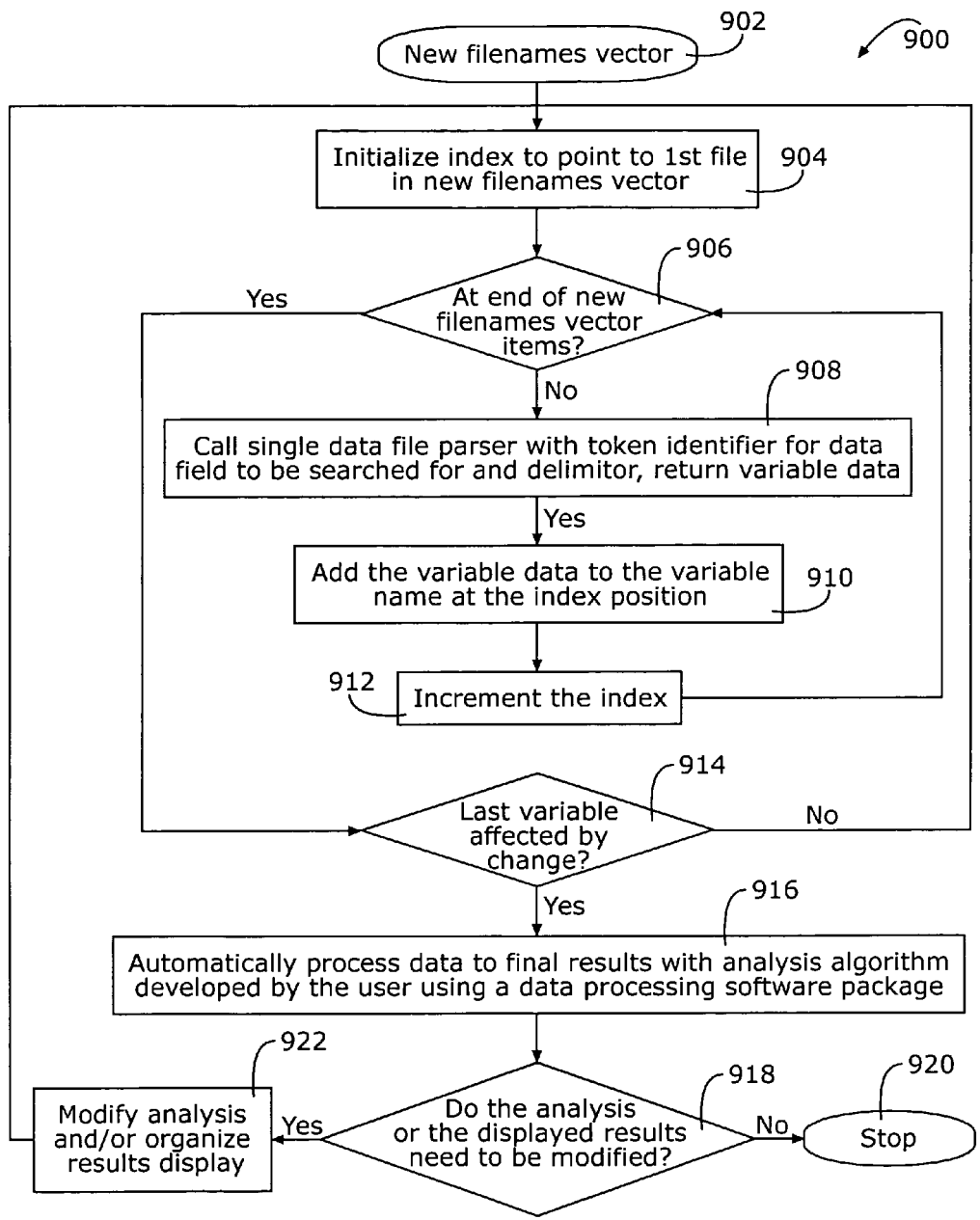
FIG. 9 is a flowchart showing the batch file parsing and processing of multiple data files in accordance with the invention.

Referring now to FIG. 9, there is shown a flowchart 900 for the operation of batch processing commands BatchText and BatchNumeric. First a new filenames vector containing the names of all text data files to be processed is obtained, block 902. The index is initialized to the first file in the filenames vector, block 904. If the last file in the filenames vector has been processed, block 906, control is transferred to block 914. Otherwise, processing continues at block 908 where a single file parsing routine is called with arguments including a desired token, a variable name to which data is to be extracted, and a delimiter. Extracted data is stored in a index position corresponding to the index of the data file being processed, block 910. The index is incremented, block 912 and control is transferred to block 906.

If the last file has been processed, block 906, a check is made as to whether this is the last variable was affected by a change in the analysis worksheet, block 914. If the last variable has been processed, final results are processed, block 916. If the analysis or displayed results are satisfactory, block 918, the process stops, block 918. Otherwise, the analysis can be modified or results can be reorganized, block 922, whereby subsequent control reverts to block 904 and the batchfile processing starts again. Control is transferred to block 904 and processing is repeated for all affected variables.

The previously-described file parsing concepts and methods may be expanded to include an additional level of functionality, that of cascading data file access. This parsing method allows users to store and parse data entries to retrieve the names of data files that are stored in other data files. So, for example, a user can store other text data file names within a first level text data file and then access the data in the files whose names have been stored (i.e., second level text data files) using the same set of commands that have been described hereinabove. For example, if a user has stored filenames of reference files in his or her first level data files with a .txt extension, the user may search those first level data files for the "ReferenceFile," token using the BatchText command.

ReferenceFiles:=BatchText(TargetFiles, "ReferenceFile, "*")

$$ReferenceFiles = \begin{pmatrix} \text{"Reference11.dat"} \\ \text{"Reference23.dat"} \\ \text{"Reference102.dat"} \end{pmatrix}$$

The user can then use the "Batch_" or the single file parsing commands to batchfile access the text data in those second level reference files (i.e., those ending with the .dat extension), as follows:

$$ReFiles := \overrightarrow{Concat(Directory, DataFiles)}$$
$$ScanRefs = BatchText(Refiles, \text{"Recipe,"}, \text{"*"})$$

$$ScanRefs = \begin{pmatrix} \text{"SmoothScan-13"} \\ \text{"JerkiScan-9"} \\ \text{"..."} \end{pmatrix}$$

In this case, the measurement protocol called "Recipe" had text entries identifying the kind of scan that was done for the second level reference file that was identified in each of the first level .txt files. The data in reference file Reference11.dat was collected using the SmoothScan-13 recipe, the data in reference file Reference23.dat was collected using the JerkiScan-9 recipe and the reference Reference102.dat was not found in the directory and the third element in the ScanRefs vector was returned as an empty string The second level RefFiles filename vector list can be used like the first level TargetFiles filename vector list to enable the extraction of text fields with the RefFiles vector for the purpose of collating and batch processing similar data. This same reasoning can be applied to as great a depth as is needed (third level, fourth level, etc.).

The system of the present invention has many advantages compared to any system of the prior art. Particularly, a user is freed from many cumbersome manual aspects of processing many data files. Using the methods of the invention, a user may flexibly organize numerous data results of interest that include many data types and data sources into a single viewing area. The single viewing area or whiteboard acts as a configurable "heads up" display of results. A method is also provided for updating an index thereby allowing semi-automated processing of individual text data files. These methods enable the user to maintain a fixed focus on the result region while rapidly processing individual or multiple data files.

A method is also provided for storing complex data in text data files such that the data is in an esthetically pleasing and commented format when viewed in a text editor. A file parsing methodology and a set of commands is described that allow importing data from such complex text data files directly into named variables in an organized and intuitively obvious manner. Text or numeric data may be imported into named variables and data may be scalar, row-wise vector, column-wise vector, or matrix form. The present invention also allows the processing of generalized embedded numeric and text data forms. Furthermore, this same method is compatible with prior art methods in that files containing only numeric or text data can be imported from fixed format (e.g. comma, space, or tab delimited) data files indirectly into named variables using the same set of commands.

In addition, methods are provided that allow automated collating of data from the same data field within multiple data files into a single named vector variable by batchfile processing a group of files. The association of the data indexed within each returned vector variable directly corresponds to the name of the file from whence it originated within a vector of file names. Analyses may then be made upon one or more said named vector variables and the processed results then used for inter-file comparison of relationships amongst results. A method is also provided which allows cascading data file access of lower-level data files from the names that have been parsed from higher level text data files.

The analysis algorithms, the file viewing and parsing commands of the present invention as well as the focus region are all contained within a single workspace. This approach greatly simplifies the interactive development of analysis algorithms and the use of those algorithms to form a flexibly configured data analysis and result display "engine". As described, such simplification relieves a user from manual data importation and processing tasks so that he or she may focus on scientific discovery and the rapid generation of reports.

Since other modifications and changes varied to fit particular operating requirements and environments will be apparent to those skilled in the art, the invention is not considered limited to the examples chosen for purposes of disclosure and covers all changes and modifications which do not constitute departures from the true spirit and scope of this invention. One such variation may be, for example, the use of start and end tags, instead of tokens, to delineate entry fields, such as is commonly done for Hypertext Markup Language (HTML) files.

While explicit methods for use in scientific data analysis have been shown for purposes of disclosure, it will be appreciated by those skilled in the art of data processing that the application of the parsing methods and user configurable display regions in a whiteboard style interface may be of utility by those involved in endeavors other than research and engineering. The inventive method may be used by individuals who must store complex information in data files for the purposes of recalling, further processing, organizing, viewing and/or reporting that information, for any application. Such individuals may find benefit from the simplifications made possible by the methods of the invention. Such applications may include, but are not limited to, storage and processing of multiple data files that contain complex sets of information about: music and movies, phone numbers and addresses, e-mail, financial and accounting data, sports and gaming statistics, student grades, patient data, personal or computer accessible activity logs.

Having thus described the invention, what is desired to be protected by Letters Patent is presented in the subsequently appended claims.

What is claimed is:

1. A data analysis parsing tool that is fully integratable into the workspace of other scientific analysis third-party graphical user interfaces (GUIs), said third-party GUIs comprising a comprehensive whiteboard-style workspace that makes available all necessary means for developing an ordered multi-step analysis using named variables, activating said multi-step analysis, performing numerical and non-numerical computations and graphically displaying the results of those analyses and computations, said data analysis parsing tool providing the third-party whiteboard GUI with new functions, capabilities and ways of usage, and comprising:
   a) means for providing single file parsing functions that directly associates the user's named analysis variable in the GUI workspace with a named data field contained within one named data file,
      wherein said functions operate as to immediately search and parse said named data field from said named data file into said named variable in said whiteboard GUI workspace as the command is entered,
      and thereafter said function once defined also automatically performs said search and parse operations each time it is called with a new named data file during the third-party's GUI automation of said multi-step analysis,
      and wherein each said named data field from within said named data file may be of the dimensions scalar, vector, or matrix,
      and wherein the said data fields within the named data file may be a mixture of the data types numeric or text,
      and wherein the user need have no prior knowledge of the dimensions of said data field prior to or during the parsing of that said data field;
   b) means for providing multi-file parsing functions to batchfile process a vector list of named data files and return a corresponding collated vector list of single-file data field parsing results into a single named variable in said GUI workspace,
      wherein said functions operate to immediately search and parse said named data field of the same name from each of multiple said named data files into said named variable in said GUI workspace,
      and thereafter said functions once defined also automatically perform said search and parse operations each time they are called with a new vector list of named data files during the third-party's GUI automation of said multi-step analysis,
      and wherein each said named data field from within each file contained within the vector list of named data files may be of the dimensions scalar, vector, or matrix,
      and wherein the said named data fields from within each file whose names are contained within the vector list of named data files may be a mixture of the data types numeric or text,
      and wherein the user need have no prior knowledge of the dimensions of said data fields within any data file from the said vector list of named data files prior to or during the parsing of that said data field from any of those named data files;
   c) a global file-selection index whose function is to change the selection of a new named data file from within a vector list of named data files and which is used as the means to initiate both the parsing and the computations of a multi-step analysis using information from data fields contained in that one newly selected named data file;
   d) said data analysis parsing tool providing the third-party whiteboard GUI with a new capability of cascading data file access, whereby said named text data fields in said named data files contain the names of yet other data files and whereby those data file names are parsed, using the above-described parsing functions, and then said parsed file names are used as a means to access their contents, using one of the group: the same above-described parsing methods, and by other file importation commands native to the third party GUI;
   e) a raw text viewer freely positionable in said third-party GUI to provide an embedded view of the contents of said at least one text data file within said third-party GUI, to act as an aid for a user to visually inspect the contents of a data file and thus remember the names of the data fields and/or to observe their dimensions and their data types; and
   f) means for transferring processed results obtained from the application of at least one of the above-mentioned techniques to a report by using a simple copy and paste operation on those results that were obtained by the combined use of the third-party whiteboard GUI and the integrated data analysis parsing tool.

* * * * *